(12) United States Patent
Kendig et al.

(10) Patent No.: US 8,014,894 B2
(45) Date of Patent: Sep. 6, 2011

(54) METHOD OF SURFACE MANUFACTURE WITH AN APEX DECENTERED FROM A SPINDLE AXIS

(75) Inventors: Stephen Kendig, Cumming, GA (US); Cornelius Daniel Niculas, Suwanee, GA (US); Jason Emanuele Molinari, Atlanta, GA (US); Nelson David Baity, Zirconia, NC (US)

(73) Assignee: Novartis AG, Basel (CH)

( * ) Notice: Subject to any disclaimer, the term of this patent is extended or adjusted under 35 U.S.C. 154(b) by 857 days.

(21) Appl. No.: 11/973,415

(22) Filed: Oct. 9, 2007

(65) Prior Publication Data
US 2008/0110306 A1 May 15, 2008

Related U.S. Application Data

(60) Provisional application No. 60/828,784, filed on Oct. 10, 2006.

(51) Int. Cl.
*G06F 19/00* (2011.01)
*B23C 1/00* (2006.01)

(52) U.S. Cl. ........ 700/193; 700/176; 700/187; 409/132; 451/5; 29/564

(58) Field of Classification Search .................. 700/176, 700/187, 193–194; 409/80, 132; 451/5, 451/11, 41–42; 29/564
See application file for complete search history.

(56) References Cited

U.S. PATENT DOCUMENTS

| 5,610,823 | A | 3/1997 | Gregory | 364/474.15 |
|---|---|---|---|---|
| 5,677,855 | A | 10/1997 | Skeeters et al. | 364/578 |
| 6,145,988 | A | 11/2000 | Manfredini | 351/177 |
| 7,494,305 | B2 * | 2/2009 | Riall et al. | 409/132 |
| 2006/0026816 | A1 | 2/2006 | Riall et al. | 29/564 |
| 2006/0055876 | A1 * | 3/2006 | Hall et al. | 351/159 |
| 2006/0253220 | A1 * | 11/2006 | McPherson et al. | 700/176 |

FOREIGN PATENT DOCUMENTS
DE 42 10 381 A1 10/1993
\* cited by examiner

*Primary Examiner* — Ramesh B Patel
*Assistant Examiner* — Douglas S Lee
(74) *Attorney, Agent, or Firm* — Robert Ambrose

(57) ABSTRACT

The present invention is related to manufacturing surfaces with an axis decentered from the spindle axis. In particular, the present invention is related to compensating for tool geometry in cutting processes that involve an oscillating tool.

12 Claims, 3 Drawing Sheets

METHOD OF SURFACE MANUFACTURE WITH AN APEX DECENTERED FROM A SPINDLE AXIS

This application claims the benefits under 35 USC 119(e) of the U.S. Provisional Patent Application No. 60/828,784 filed Oct. 10, 2006, herein incorporated by reference in its entirety.

FIELD OF THE INVENTION

The embodiments found in this disclosure are related to manufacturing surfaces with the axis decentered from the spindle axis. In particular, one embodiment is related to compensating for tool geometry in cutting processes that involve an oscillating tool.

BACKGROUND OF THE INVENTION

Lathing lenses was the favored technique for producing rigid gas permeable lenses (RGPs). With the advent of computer numerical control (CNC) lathing contact lenses became a more viable means of mass producing lenses, although DSM (double-sided molding) processes may be the most preferred way.

Lathing may be a preferred technique for creating specialty lenses, such as lenses for presbyopia and astigmatism, or for custom lenses. As a manufacturing technique, lathing requires specific tolerances, much like any other process but tool wear/compensation may also require additional machining steps to achieve desired tolerances.

Lathing may be used to create front and/or back surfaces of lenses and/or of lens molds. In back surface lathing or machining, a blank or button may be used. The blank may be fed into a chuck to hold the button. Once the blank is held by the chuck, the spindle holding the chuck and button begins to rotate and feed or advance toward the cutting tools. Cutting tools may be made of various materials. Exemplary or preferred materials include extremely hard materials, such as diamonds and the like. The first step in lathing a lens or a mold is to lathe the blank into the proper part diameter. Next, a roughing tool may be used to cut the initial back surface geometry using a plurality of preprogrammed cuts. Typically another step is needed to make the final cuts. Each progressive path cut may be adjusted for depth and geometry by adjusting the feed or advance amount, and/or the spindle speed. The back surface of the blank/part may also be polished in any conventional manner.

After the back surface is machined, the front surface may be blocked. In this process, the part may be mounted onto a front surface tool using low melting point wax. This step of wax mounting is desirable to help avoid the potential situation wherein the back surface is not at right angles to the axis of the spindle, which may result in unwanted prism in the created mold or lens. After blocking/mounting, the front surface is lathed. Similar to the back surface lathing, the partially-finished part (button) is fixed into or onto a chuck to hold the partially-finished button. The partially-finished button must be located by the lathes, which is usually accomplished with a sensor probe that establishes the center reference point. This reference point allows a computer/controller in a computer numerical control lathe to calculate the amount the cutting tool must feed or advance in order to arrive at the required or desired center thickness of the lens.

The processes described above are typically used for symmetric designs. Oftentimes lenses and lens molds are needed that are not symmetrical, such as for example, lenses designed for presbyopia or astigmatism. These types of lenses and corresponding molds may have optical or manufacturing axes that are not the same axis as the spindle and/or the center of the lens. For example, the part may need to be cut from the point of maximum thickness, which may not be the geometric center of the part. Techniques used for creating these lenses or molds include offsetting the part such that the axis of the part aligns with the center axis of the spindle. This method is inefficient as the part must be moved multiple times to cut and finish the geometry. The present invention seeks to correct these and other deficiencies in the prior art.

As would be obvious to one skilled in the art, many variations and modifications of the embodiments found in this application may be effected without departing from the spirit and scope of the novel concepts of the disclosure.

SUMMARY OF THE INVENTION

In accomplishing the foregoing, there is provided, in accordance with one aspect of the present invention, a method for cutting a surface with the apex of a part decentered from the spindle axis, the method including the steps of aligning a decentralized apex with a spindle axis; defining a central axis as a radial distance from the spindle axis; characterizing part design as a series of points; translating the series of points into a stacked elevational map; storing the stacked elevational map as a first mini-file; compensating for tool geometry; creating a second mini-file with the geometry-compensated values; transmitting the second mini-file to a computer numerical control lathe; and cutting part material with an oscillating tool according to the second mini-file.

In embodiments and accordance with another aspect of the present invention, there is provided a method for compensating for diamond tool geometry which may include the steps of creating a representation of a part surface; calculating the X and Z values for specific locations; calculating the desired position of a diamond tool relative to the surface point to be cut; compensating for the diamond tool radius to determine proper tool position to generate recalculated points; and calculating a geometry-compensated zero meridian. The method may, in embodiments, include aspects wherein the step of creating a representation of a part includes representing a part surface as a spiral and defining meridians within the spiral. In still other embodiments, the step of calculating the X and Z values for specific locations may further include measuring the distance between two curves of the spiral, then dividing the distance between the curves by the number of meridians, and equating a Z value along the zero meridian.

In still another embodiment, the method may include aspects wherein calculating the desired position of a diamond tool includes projecting a line at the tool axis angle from the zero meridian to the meridian being compensated; and projecting a vector normal to the point determined in the preceding step to find the center of the diamond tool. The tool axis angle may be between about 0 degrees and about 45 degrees. In further embodiments, the compensating step may also include offsetting the desired surface location by the tool radius value perpendicular to the current meridian. The step of calculating a geometry-compensated zero meridian may further include rotating the recalculated points about the origin by a tool axis angle, and averaging the values of the highest and lowest meridians at each point calculated. The method may further include the step of recording all tool geometry compensated values in a mini-file. Exemplary surfaces or parts which may be produced according to the method of the invention include, for example, lenses and lens molds.

DETAILED DESCRIPTION

Reference now will be made in detail to the embodiments of the invention. It will be apparent to those skilled in the art that various modifications and variations can be made without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the manufacturing procedures are well known and commonly employed in the art. Conventional methods are used for these procedures, such as those provided in the art and various general references. Where a term is provided in the singular, the inventors also contemplate the plural of that term.

The embodiments found herein seek to provide an efficient method for lathing a surface with the axis decentered from the spindle axis using an oscillating tool. This method is an improvement over the prior art and provides a method in which part "re-chucking" during the cutting operation is minimized.

Figure 1:
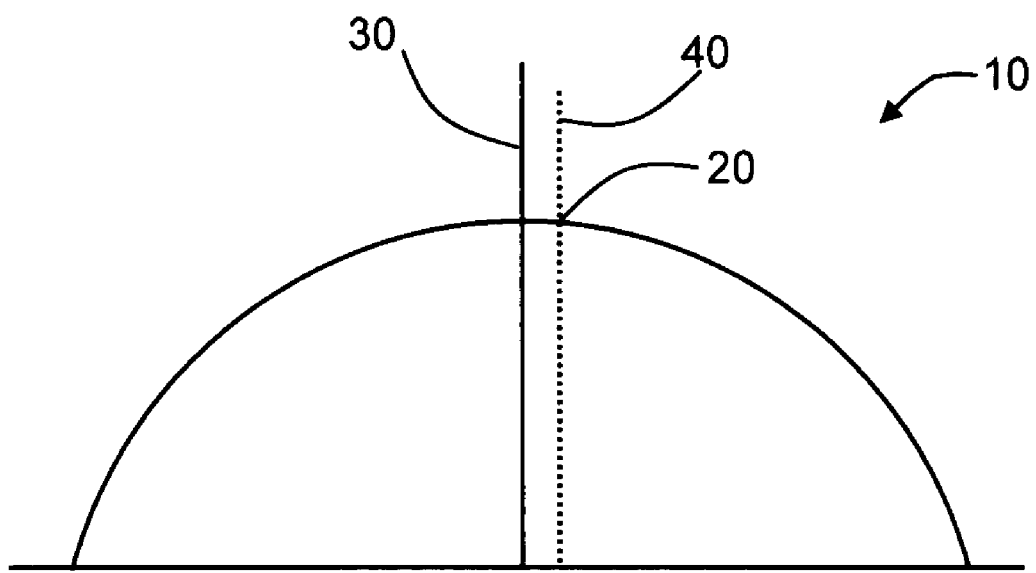
FIG. 1 shows an exemplary lens or surface of a lens mold in which the optical axis is not aligned with the central axis.

Referring to FIG. 1, a schematic of a side sectional view of lens design is shown. In FIG. 1, lens 10 is shown in which the optical apex 20 is decentered from the central axis 30 of the lens 10. In this embodiment, the axis of the spindle (not shown for clarity) is not aligned with the apex 20 of the part (lens), or point or maximum thickness of the part. Rather, the apex 20 of the part lies offset from the central axis 30 and the spindle axis, and may further be offset from the optical axis (shown as dotted line 40) of the lens 10. The spindle axis and the optical axis may be aligned.

Computer numerical control lathing is accomplished by programming the lathe to cut according to a lens or mold design. This can be accomplished through mathematics and various types of software including software capable of representing a three-dimensional image and CAD/CAM software. For all purposes, however, the lens or mold design must be "translated" into a series of points that can be fit to a mathematically defined curve that the computer numerical control lathe can recognize and cut.

Figure 3:
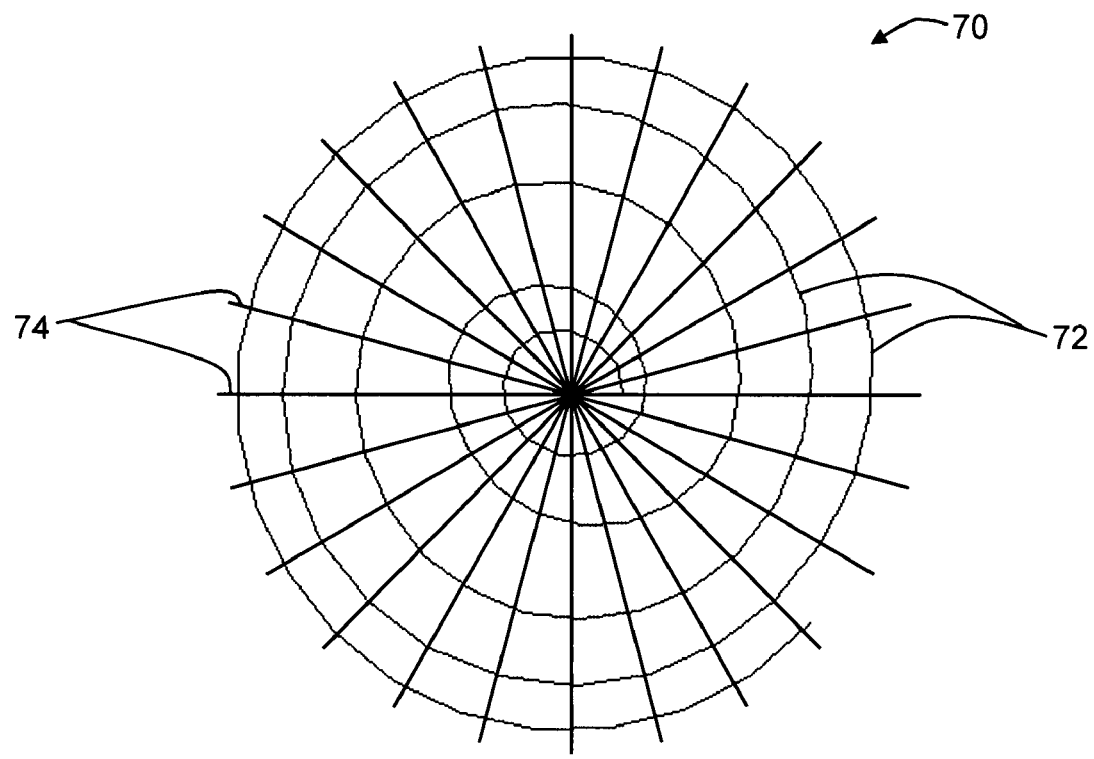
FIG. 3 depicts a spiral representation of a lens or mold geometry.

In one embodiment, the design may first be categorized by dividing it into sections. Once the design has been captured as a series of points, the design can be translated into a stacked elevational map of the part 70, which may be such as a lens or mold, as shown in FIG. 3. This information or data is stored as a "mini-file", that is, a data file containing information which includes both the information for the header or identification of the lens, and information about the geometry of a lens, which data is in a form that is interpretable by a computer-controlled manufacturing device such as a computer-controlled lathe. Additional information relating to methods for converting a desired lens design to a geometry of a contact lens that is to be produced in a computer-controlled manufacturing system is disclosed in U.S. Patent Application Publication No. 20060055876A1, which published on Mar. 16, 2006.

Figure 2:
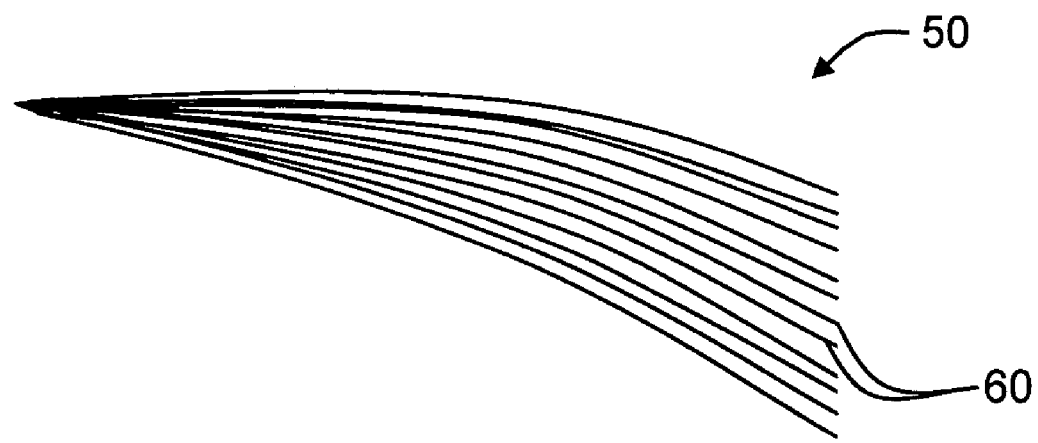
FIG. 2 depicts a build-map of the lens or surface of a lens mold of FIG. 1.

The mini-file creates the build-map, for example, such as the build-map 50 shown in FIG. 2. Each of the lines 60 illustrated in FIG. 2 defines a path that the cutting tool follows to cut that particular cross section of the lens. For purposes of clarity, only a few lines 60 are shown in FIG. 2; however, it is to be understood that many more paths for the cutting tool to follow may be and, conventionally are, described and utilized. Oscillating tools are defined by having a diamond cutting tool (or other cutting part) mounted on a Variform (available from Precitech, Inc., having offices in Keene, N.H.) or other suitable device which has the ability to oscillate as the spindle of the lathe rotates, creating a non rotationally symmetrical surface.

For oscillating tools, an additional step must be taken after a mini-file is created. This step, referred to as "tool geometry compensation", is designed to compensate for the radius and shape of the diamond tool and is distinct from, for example, simple tool wear compensation. When the diamond tool oscillates in and out of the part, the computer numerical control system on the lathe calculates or controls the cut as if the diamond tip of the tool is a theoretical sharp, that is, a finite point not having an appreciable radius. In practice, any diamond tip has a radius that is unique for each diamond. If this tip radius is not compensated for, undesired effects will occur, such a tool drag across the part to be cut.

The first step in tool geometry compensation may include reading a pre-generated mini-file into a computer memory. Next, referring again to FIG. 3, the spiral step-over distance (the distance between the meridian lines 74 along the spiral rings 72, which spiral rings are generated during a machining/cutting process), is represented on the surface of the desired part design as shown in FIG. 3. This spiral can be calculated based upon the appropriate revolutions per minute and feed rate specified by the tool compensation program or other source. The number of spiral rings (i.e., the number of revolutions) created is determined by the feed rate and spindle revolutions per minute. More spiral rings are created with slower feed rate and higher revolutions per minute.

Figure 4:
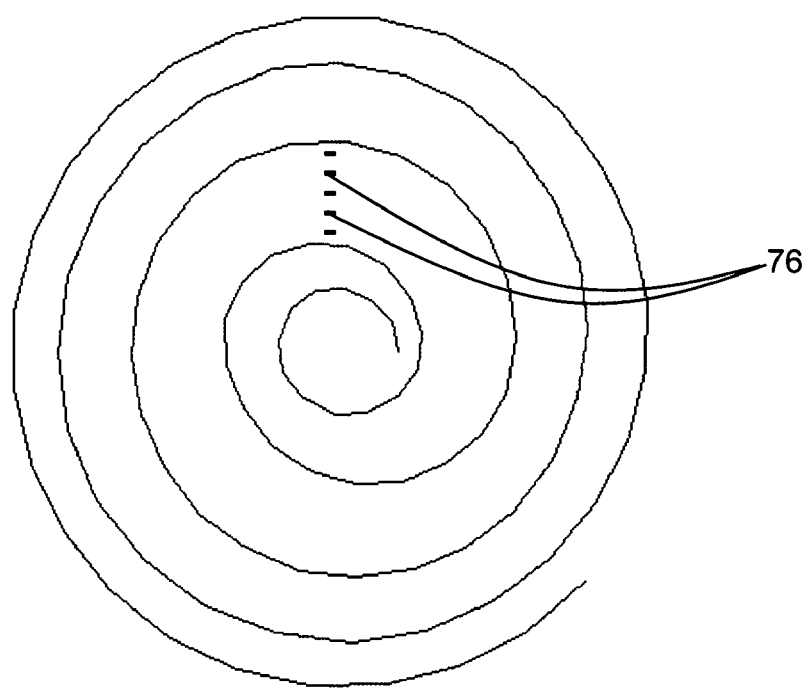
FIG. 4 depicts the spiral representation of FIG. 3 with defined meridian points.

Once the spiral step is plotted, the distance between two curves of the spiral is calculated. The number of meridians defining the surface of the part is pre-determined by the mini-file (for example, 24, 96, or 384 meridians). The meridians represent the cross section of the surface at a particular angle. When larger numbers of meridians are used, the size of the mini-file increases; however the representation of the actual surface is more accurate. The distance between any two spiral curves along a given meridian is then preferably divided by the number of meridians to establish the X location of each point 76 on the meridian as is shown in FIG. 4. For purposes of clarity, only 4 location points 76 are shown in FIG. 4; however, it is to be understood that many more points may be described and utilized.

Figure 5:
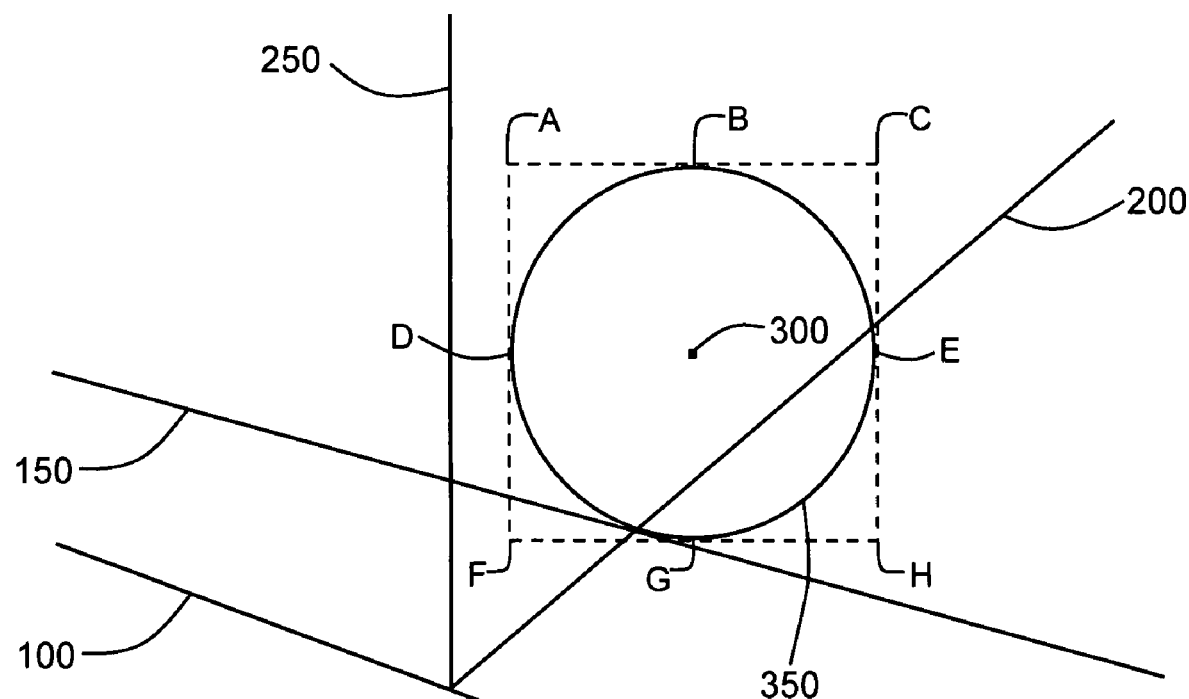
FIG. 5 depicts a representation of the tool geometry compensation method.

Referring to FIG. 5, one aspect of the compensation methodology is shown. After the X location of the uncompensated surface points is established, the X location may be matched to the Z location on the zero meridian shown as line 100. The zero meridian 100 is a 2-dimensional path that corresponds to the defined path of the lathe slides, which is preferably an average of all of the meridians. The X locations are indicated by the current slice diameter, represented by line 250. For every X location along line 250 there is only one Z location on the zero meridian 100. For each point on the zero meridian 100, a line 200 (the tool axis angle) may be projected at the oscillating tool angle until it intersects the meridian being compensated (current meridian 150). This tool axis angle 200 is set as defined in the lathe configuration, and may be of any angle between and including 0 degrees and 45 degrees.

At the intersection of the projected line 200 (the tool axis angle) from the preceding step and the current meridian 150 being compensated, a new vector (not shown) may be projected normal to the meridian being compensated 150 to find the center 300 of the diamond tool represented by circle 350. The radius of the diamond tool is known and hence, can be programmed. This point 300 represents the uncompensated diamond tool center. Referring to FIG. 5, the intersection of a horizontal tangent line (shown as dotted line F-H) and the diamond radius is the theoretical sharp; a diamond with a radius of 0. The center of the diamond having a radius of 0, on this lathe is taken to be point "G", which is depicted by location G in FIG. 5. Location G is the location where the cut may be applied to adhere to the lens design. A different "location G" exists for each X and Z. The collection of all of the generated location G's (for each X and Z) is the true compensated surface for the particular diamond tool. The true compensated surface is to compensate for the diamond radius, which is unaccounted for in the lathe software for an oscillating surface, the value of the theoretical sharp is used to determine the geometry-compensated position. The value for the theoretical sharp is determined by the type of lathe used and the lathe compensation program. This process is repeated for each meridian in the spiral to create a series of new points.

Furthermore, the intersection of horizontal tangent lines and vertical tangent lines bounding the diamond radius describe a square such as the square shown in FIG. 5 described by horizontal lines A-C and F-H, and vertical lines A-F and C-H. In some embodiments and/or for other tooling equipment, the value used to determine the geometry-compensated position may be at point or location "A" as described above, while for other embodiments and/or for other tooling equipment, the value may be at any of points A, B, C, D, E, F, G or H as shown, where points or locations A, C, H and F are located at the intersections of the horizontal and vertical tangent lines, and points B, D, E and G are located at the intersection of the horizontal and vertical tangent lines with the diamond radius.

After all points are determined according to the above method, a new zero meridian must be calculated. This is accomplished by theoretically rotating all calculated values about the origin at the tool axis angle and calculating the average of the highest and lowest meridians. This average represents the new geometry-compensation zero meridian, which compensates to create the correct tool cutting path for the lathe slide to follow. After these calculations are completed the new values are saved as a second mini-file. This mini-file is then transmitted to the computer numerical control lathe.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

We claim:

1. A method for cutting a surface with the apex of a part decentered from the spindle axis in a lathing process comprising:
   aligning a decentralized apex with a spindle axis;
   defining a central axis as a radial distance from the spindle axis;
   characterizing part design as a series of points;
   translating the series of points into a stacked elevational map;
   storing the stacked elevational map as a first mini-file;
   compensating for tool geometry;
   creating a second mini-file with the geometry-compensated values;
   transmitting the second mini-file to a computer numerical control lathe; and
   cutting a rotating part material with an oscillating tool according to the second mini-file.

2. A method for compensating for diamond tool geometry comprising:
   creating a representation of a part surface as a spiral and defining meridians within the spiral;
   calculating the X and Z locations;
   calculating the desired position of a diamond tool relative to the surface point to be cut;
   compensating for the diamond tool radius to determine proper tool position to generate recalculated points; and
   calculating a geometry-compensated zero meridian.

3. The method of claim 2 wherein calculating the X and Z locations comprises:
   measuring the distance between two curves of the spiral;
   dividing the distance between the curves by the number of meridians; and
   equating a Z value along the zero meridian.

4. The method of claim 2, wherein calculating the desired position of a diamond tool comprises:
   projecting a line at the tool axis angle from the zero meridian to the meridian being compensated; and
   projecting a vector normal to the point determined in the preceding step to find the center of the diamond tool.

5. The method of claim 2, wherein the compensating step further comprises offsetting the desired surface location by the tool radius value perpendicular to the current meridian.

6. The method of claim 2, wherein calculating a geometry-compensated zero meridian further comprises rotating the recalculated points about the origin by a tool axis angle and averaging the values of the highest and lowest meridians at each point calculated.

7. The method of claim 2, further comprising recording all tool geometry compensated values in a mini-file.

8. The method of claim 4, wherein the tool axis angle is between 0 and 45 degrees.

9. The method of claim 1, wherein said part is a lens.

10. The method of claim 1, wherein said part is a lens mold.

11. The method of claim 2, wherein said part is a lens.

12. The method of claim 2, wherein said part is a lens mold.

* * * * *